United States Patent
Hunt

(10) Patent No.: US 11,234,367 B2
(45) Date of Patent: Feb. 1, 2022

(54) SYSTEMS AND METHODS FOR ADJUSTING A FLEXIBLE CUTTER BAR ASSEMBLY

(71) Applicant: CNH Industrial America LLC, New Holland, PA (US)

(72) Inventor: Cory Douglas Hunt, Millersville, PA (US)

(73) Assignee: CNH Industrial America LLC, New Holland (*) Notice: Subject to any disclaimer, the term of this patent is extended or adjusted under 35 U.S.C. 154(b) by 210 days.

(21) Appl. No.: 16/724,625

(22) Filed: Dec. 23, 2019

(65) Prior Publication Data
US 2021/0185915 A1 Jun. 24, 2021

(51) Int. Cl.
| | |
|---|---|
| A01D 41/14 | (2006.01) |
| A01D 34/38 | (2006.01) |
| A01D 34/28 | (2006.01) |
| A01D 34/14 | (2006.01) |
| A01D 34/04 | (2006.01) |

(52) U.S. Cl.
CPC ........... *A01D 41/141* (2013.01); *A01D 34/14* (2013.01); *A01D 34/283* (2013.01); *A01D 34/38* (2013.01); *A01D 41/145* (2013.01); *A01D 34/04* (2013.01)

(58) Field of Classification Search
CPC .... A01D 41/141; A01D 41/145; A01D 34/14; A01D 34/283
See application file for complete search history.

(56) References Cited

U.S. PATENT DOCUMENTS

| | | |
|---|---|---|
| 5,359,836 A | 11/1994 | Zeuner et al. |
| 6,230,089 B1 | 5/2001 | Lonn et al. |
| 6,871,483 B1 | 3/2005 | Panoushek |
| 7,866,133 B2 | 1/2011 | Funk et al. |
| 7,950,212 B1 | 5/2011 | Figgins et al. |
| 7,992,374 B1 | 8/2011 | Bich et al. |
| 8,261,521 B2 | 9/2012 | Thompson |
| 10,299,434 B2 | 5/2019 | Yanke et al. |

(Continued)

FOREIGN PATENT DOCUMENTS

| | | |
|---|---|---|
| EP | 0786200 B1 | 5/2003 |
| EP | 3427564 A1 | 1/2019 |

(Continued)

OTHER PUBLICATIONS

U.S. Appl. No. 16/724,872, filed Dec. 23, 2019, Cory Douglas Hunt.
(Continued)

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

An agricultural system includes an arm configured to rotate about a pivot joint and to support a portion of a cutter bar assembly, a fluid-filled biasing member slidingly coupled to the arm, an actuator coupled to the fluid-filled biasing member, a fluid pressure sensor configured to measure a fluid pressure in the fluid-filled biasing member, and a controller communicatively coupled to the actuator. The controller is configured to receive an input signal from the fluid pressure sensor indicative of the fluid pressure and to output an output signal to instruct the actuator to adjust a connection point between the fluid-filled biasing member and the arm based on the input signal.

20 Claims, 7 Drawing Sheets

(56) References Cited

U.S. PATENT DOCUMENTS

| 2018/0153102 A1 | 6/2018 | Dunn et al. |
| 2019/0003496 A1 | 1/2019 | Hunt et al. |
| 2019/0110397 A1 | 4/2019 | Brimeyer et al. |

FOREIGN PATENT DOCUMENTS

| EP | 3473076 A1 | 4/2019 |
| WO | 2018166797 A1 | 9/2018 |
| WO | 2019055521 A1 | 3/2019 |

OTHER PUBLICATIONS

U.S. Appl. No. 16/724,892, filed Dec. 23, 2019, Cory Douglas Hunt.

SYSTEMS AND METHODS FOR ADJUSTING A FLEXIBLE CUTTER BAR ASSEMBLY

BACKGROUND

The present disclosure relates generally to a cutter bar assembly for an agricultural header.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

A harvester is a type of automated machine generally used to efficiently harvest a variety of crops, such as wheat, barley, oats, millet, rye, soybeans, corn, or other plant crops. The seeds of these crops are a principal source of human food, but the coating of the seeds (the chaff) are inedible and have to be discarded, along with the other parts including leaves and stalks. As the harvester moves through a field of crops, it cuts, threshes, and cleans the seeds automatically via cutter bars, wheels, conveyors, threshing drums, sieves, elevators, and other components. The processed seeds are collected in a tank inside the harvester, while the unwanted parts pass through an exit pipe or a spreader and fall down onto the field.

Crops may be gathered in by a header at the front of the harvester. In general, the wider the header, the faster and more efficiently the harvester can cut the field. The header may include a cutter bar assembly, which may run the entire width of the header. The cutter bar assembly may include teeth that cut the crops as the harvester travels through the field.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an agricultural system includes an arm configured to rotate about a pivot joint and to support a portion of a cutter bar assembly, a fluid-filled biasing member slidingly coupled to the arm, an actuator coupled to the fluid-filled biasing member, a fluid pressure sensor configured to measure a fluid pressure in the fluid-filled biasing member, and a controller communicatively coupled to the actuator. The controller is configured to receive an input signal from the fluid pressure sensor indicative of the fluid pressure and to output an output signal to instruct the actuator to adjust a connection point between the fluid-filled biasing member and the arm based on the input signal.

In a second embodiment, a harvester header includes a frame, a cutter bar assembly configured to cut the crops, an arm coupled to the frame and to the cutter bar assembly, and an air system coupled to the frame and to the arm. The air system includes a fluid-filled biasing member configured to provide an upward force on the cutter bar assembly via the arm, an air pressure sensor configured to measure an air pressure in the air system, and a carriage configured to provide an adjustable mechanical connection point between the fluid-filled biasing member and the arm.

In a third embodiment, a method of operating a harvester header includes receiving, at a controller, an input signal indicative of an air pressure within an air system of the harvester header. The method also includes outputting, via the controller, an output signal to an actuator to cause the actuator to drive a carriage coupled to a fluid-filled biasing member along an arm that supports a cutter bar assembly of the harvester header in response to the input signal being indicative of a change in the air pressure within the air system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
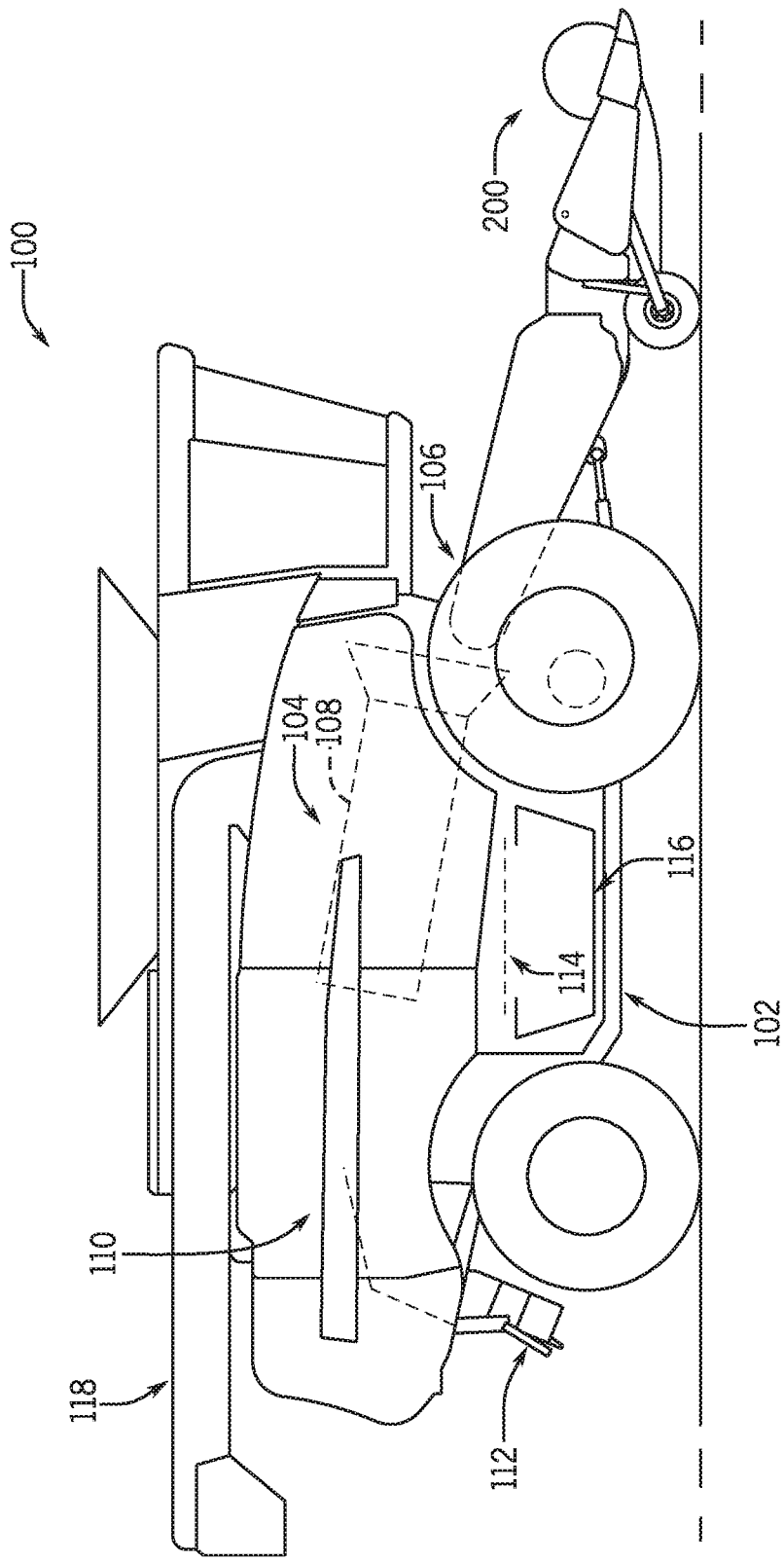
FIG. 1 is a side view of an embodiment of a harvester.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a header for a harvester. The harvester may be configured to cut agricultural crops via a cutter bar assembly of the header. As the cutter bar assembly cuts the crops, conveyor(s) coupled to deck(s) of the header move the crops toward a crop processing system of the harvester. For example, conveyor(s) on side deck(s) may move the cut crops toward an infeed deck at a center of the header. A conveyor on the infeed deck may then move the crops toward the processing system.

The cutter bar assembly may be a flexible cutter bar assembly that is supported by multiple arms (e.g., longitudinally-extending arms) distributed along the width of the header. In certain cases, each arm is pivotally mounted to a header frame of the header by a pivot joint, therefore enabling the cutter bar assembly to pivot relative to the header frame and to flex along a lateral axis of the header during harvesting operations. In some cases, the arms may be driven by a hydraulic system to adjust a contact force between the cutter bar assembly and the ground (e.g., to adjust floatation pressure). However, the hydraulic system may be slow to move the cutter bar assembly to a desired position relative to the ground. Alternatively, the arms may be driven by an air system (e.g., pneumatic system; pressurized air system) to control the contact force between the cutter bar assembly and the ground. However, the air system may be a static or closed system with no source of pressurized air (e.g., no air compressor) on the header or the harvester. Thus, an air pressure within the air system may drop over time, such as due to leakage or temperature change, for example. Accordingly, the disclosed embodiments provide systems and methods for compensating for a reduction of the air pressure within the air system. In this way, the disclosed embodiments advantageously maintain certain operating characteristics of the header (e.g., contact force between the cutter bar assembly and the ground; floatation pressure) even as the air pressure in the air system drops over time. As discussed in more detail below, the air system may include biasing members (e.g., air-filled biasing members; air spring) that support the arms coupled to the cutter bar assembly. The biasing members provide an upward force on the cutter bar assembly, via the arms, to control the contact force between the cutter bar assembly and the ground. In certain embodiments, the air system may include an air pressure sensor configured to monitor the air pressure within the air system. In operation, a header controller monitors the air pressure within the air system and makes mechanical adjustments to maintain a substantially constant upward force on the cutter bar assembly through a range of decreasing air pressures within the air system. For example, by mechanically adjusting a connection point of the biasing members to the arms, a reduced force, which is caused by the reduced pressure, can be shifted to act at a distance further from the pivot joint, thereby maintaining a substantially constant moment on the arm (e.g., varying by less than or equal to approximately 1, 2, 3, 4, 5, 10, 15 or 20 percent) as the harvester travels through the field and/or over time (e.g., throughout the season, and for a set or desired floatation pressure). In some embodiments, the air system may be devoid of a force sensing feedback, as the geometric relationship of the airbag, mechanical connection, and pivot joint are known and can be calculated to determine the appropriate movement or location of the connection point based on the pressure.

Turning to the drawings, FIG. 1 is a side view of an embodiment of a harvester 100 (e.g., combine harvester) having a header 200. The harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system 114 (such as sieves) located beneath the thresher 108. The cleaning system 114 may remove debris from the desired crop material and transport the desired crop material to a storage tank 116 within the harvester 100. When the storage tank 116 is full, a tractor with a trailer on the back may pull alongside the harvester 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the harvester 100 via a crop residue spreading system 112 positioned at the aft end of the harvester 100.

Figure 2:
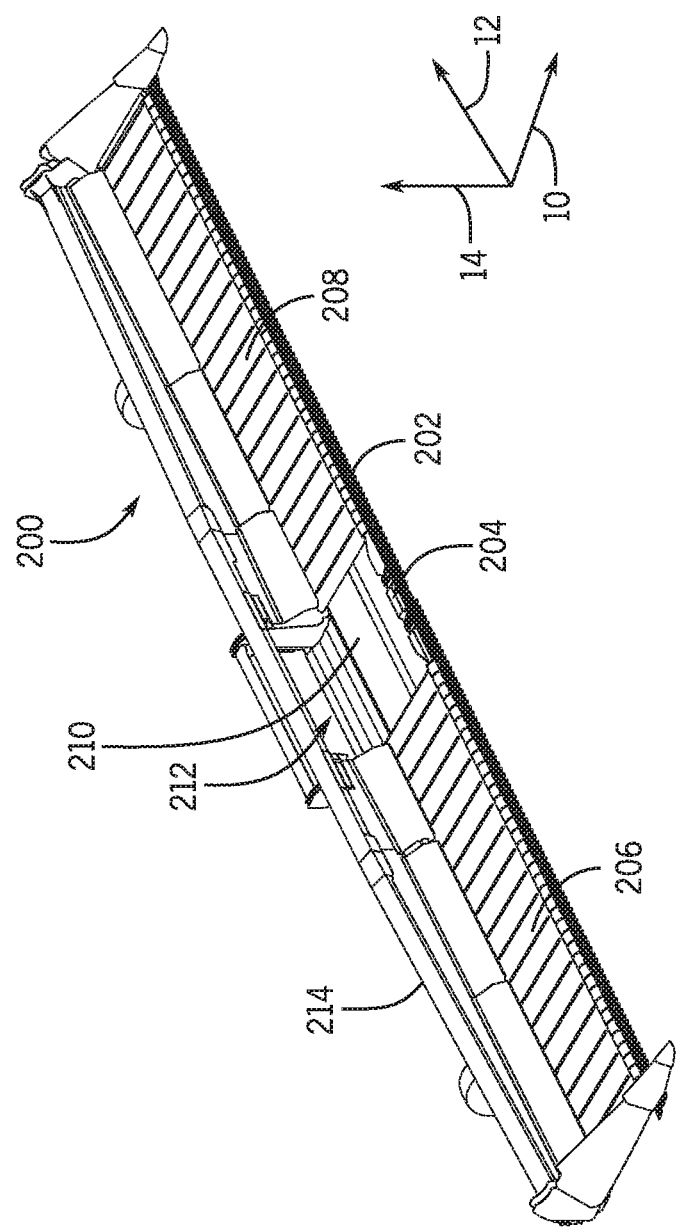
FIG. 2 is a perspective view of an embodiment of a header that may be employed within the harvester of FIG. 1.

FIG. 2 is a perspective view of an embodiment of a header 200 (e.g., draper header) that may be employed within the harvester 100 of FIG. 1. To facilitate discussion, the header 200 and certain components of the header 200 may be described with reference to a longitudinal axis 10, a lateral axis 12, and a vertical axis 14. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to the longitudinal axis 10 of the header 200. The cutter bar assembly 202 extends along a substantial portion of the width of the header 200 (e.g., the extent of the header 200 along the lateral axis 12). As discussed in detail below, the cutter bar assembly 202 includes a blade support, a moving blade assembly, and a stationary guard assembly. The moving blade assembly is fixed to the blade support (e.g., above the blade support relative to the vertical axis 14 of the header 200), and the blade support/moving blade assembly is driven to oscillate relative to the stationary guard assembly. In the illustrated embodiment, the blade support/moving blade assembly is driven by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages and cuts a portion of crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable driving mechanism, such as an electric motor or a hydraulic motor. The first lateral belt 206 and the second lateral belt 208 are driven such that the top surface of each belt moves laterally inward. These lateral belts move the cut crops inwardly to a longitudinal belt 210 positioned between the first lateral belt 206 and the second lateral belt 208 along the lateral axis 12. The longitudinal belt 210 is driven to rotate by a suitable driving mechanism, such as an electric motor or a hydraulic motor. The longitudinal belt 210 is driven such that the top surface of the longitudinal belt 210 moves rearward along the longitudinal axis 10. As a result, the cut crops are transported through an opening 212 in the header 200 to the inlet 106 (FIG. 1) of the agricultural crop processing system 104 (FIG. 1) for further processing of the cut crops.

As illustrated herein, the cutter bar assembly 202 is flexible along the width of the header 200 (e.g., the extent of the header 200 along the lateral axis 12). As discussed in detail below, the cutter bar assembly 202 is supported by multiple arm assemblies distributed along the width of the header 200. The header 200 includes a frame 214 (e.g., header frame) that may be movably coupled to a frame of the harvester 100 (e.g., harvester frame). Each arm assembly is mounted to the frame 214 and includes an arm configured to rotate about the lateral axis 12 and/or move along the vertical axis 14 relative to the frame 214. Each arm is coupled to the cutter bar assembly 202, thereby enabling the cutter bar assembly 202 to flex during operation of the harvester 100. The cutter bar assembly 202 may follow the contours of the field, thereby enabling the cutting height (e.g., the height at which each crop is cut) to be substantially constant along the width of the header 200.

Figure 3:
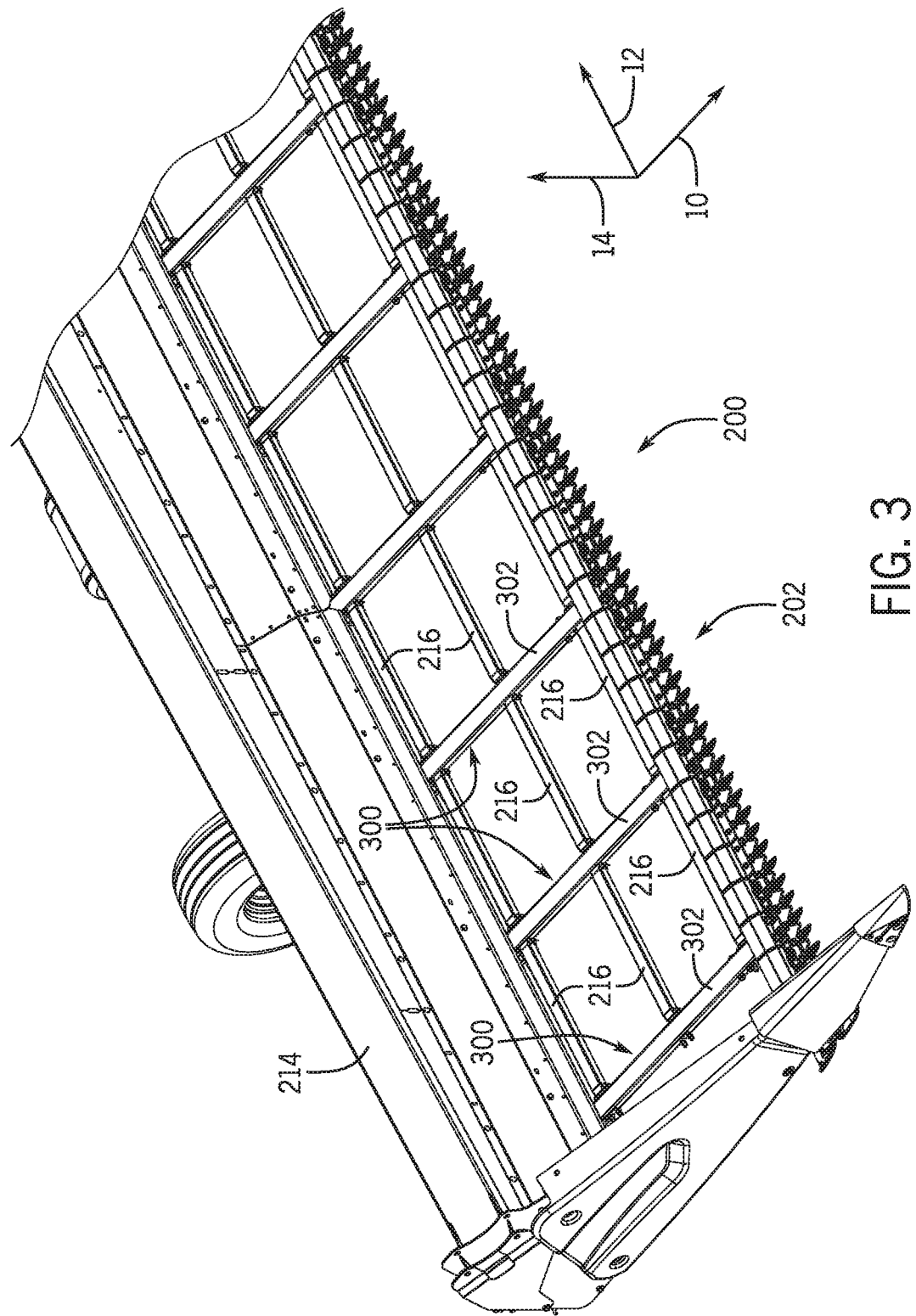
FIG. 3 is a perspective view of a portion of the header of FIG. 2, including a cutter bar assembly and arm assemblies that support the cutter bar assembly.

FIG. 3 is a perspective view of a portion of the header 200 of FIG. 2, including the frame 214, the cutter bar assembly 202, and arm assemblies 300 that support the cutter bar assembly 202. As illustrated, each arm assembly 300 includes an arm 302 (e.g., flex arm or movable arm) that extends substantially along the longitudinal axis 10. However, in alternative embodiments, each arm 302 may extend in any suitable direction. In the illustrated embodiment, the arm assemblies 300 are distributed along the width of the header 200 (e.g., the extent of the header along the lateral axis 12). The spacing between the arm assemblies 300 may be selected to enable the arm assemblies 300 to support the cutter bar assembly 202 and to enable the cutter bar assembly 202 to flex during operation of the header 200.

As discussed in detail below, each arm 302 is coupled to the frame 214 by a biasing member and an actuator of the respective arm assembly 300. The biasing member and the actuator enable the arm 302 to rotate (e.g., about the lateral axis 12) and/or move vertically (e.g., along the vertical axis 14) relative to the frame 214, thereby enabling the cutter bar assembly 202, which is supported by the arms 302, to flex in response to variations in the contours of the field. The ability of the cutter bar assembly 202 to flex enables the harvester 100 (FIG. 1) to precisely cut the crops at a target height, thereby increasing crop yields while harvesting, for example.

In the illustrated embodiment, lateral supports 216 (e.g., laterally-extending support bars) extend between respective pairs of arms 302. A first end of each lateral support 216 is pivotally coupled to one arm 302, and a second end of each lateral support 216 is pivotally coupled to another arm 302. The lateral supports 216 are configured to support the respective lateral belt (e.g., belt 206 or FIG. 2), while enabling the arms to rotate/move relative to the frame 214. While three lateral supports 216 are positioned between each pair of arms 302 in the illustrated embodiment, in other embodiments, more or fewer lateral supports 216 may be positioned between at least one pair of arms 302. Furthermore, in certain embodiments, the lateral supports 216 may be omitted between at least one pair of arms 302.

Figure 4:
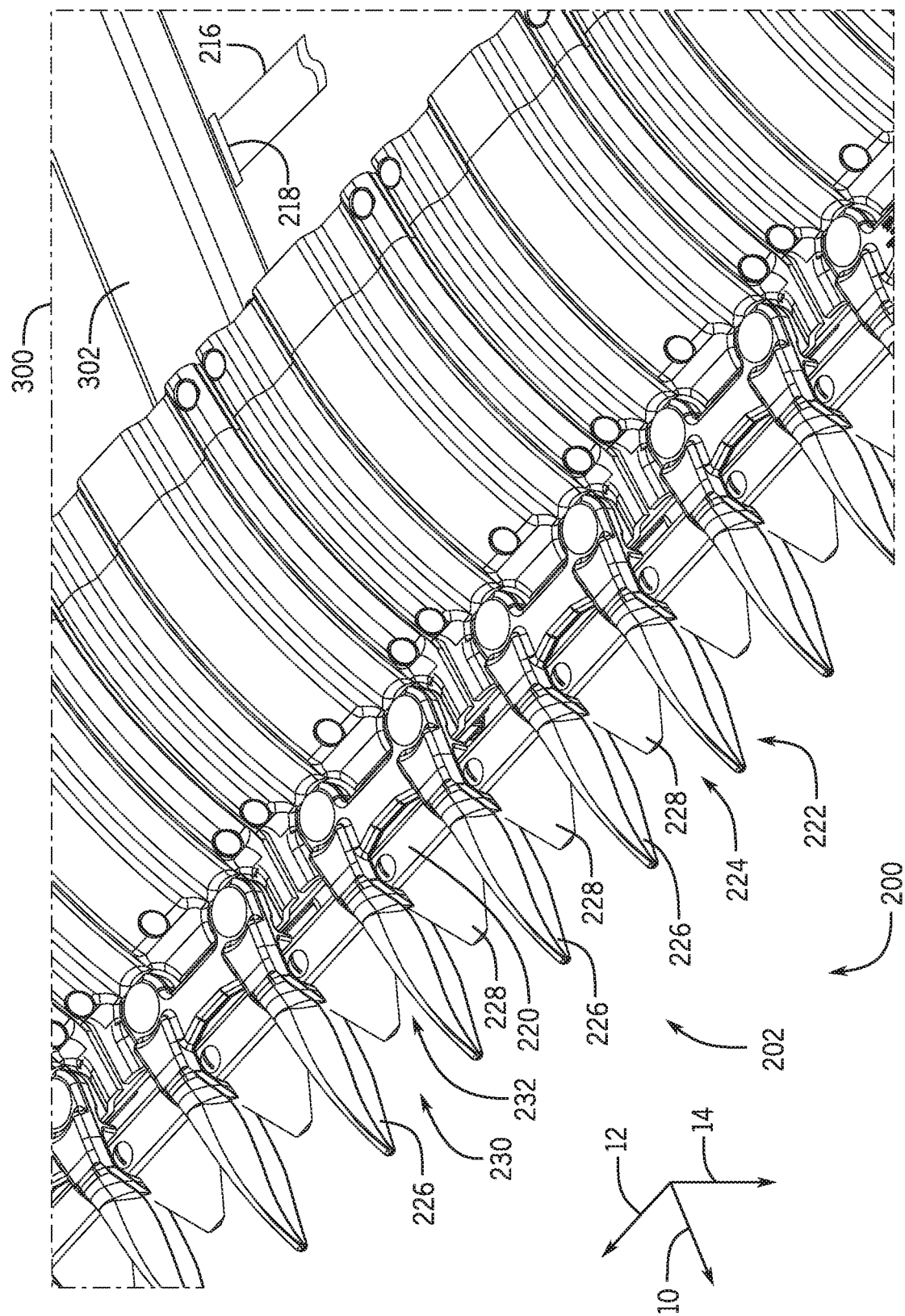
FIG. 4 is a perspective view of a portion of the cutter bar assembly of FIG. 3.

FIG. 4 is a perspective view of a portion of the cutter bar assembly 202 of FIG. 3. As illustrated, the cutter bar assembly 202 includes a blade support 220, a stationary guard assembly 222, and a moving blade assembly 224. The moving blade assembly 224 is coupled to the blade support 220, and the blade support 220/moving blade assembly 224 are driven to oscillate relative to the stationary guard assembly 222. The stationary guard assembly 222 includes multiple stationary guards 226 distributed along the width of the stationary guard assembly 222 (e.g., the extent of the stationary guard assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary guards 226. When the header 200 is moved through the field by the harvester 100 (FIG. 1), a portion of a crop (e.g., the stalk) may enter a gap 230 between adjacent stationary guards 226 and a gap 232 between adjacent moving blades 228. Movement of the moving blade assembly 224 causes a moving blade 228 to move across the gap 230 in the stationary guard assembly 222, thereby cutting the portion of the crop.

In the illustrated embodiment, the stationary guard assembly 222 is coupled to the arms 302 of the arm assemblies 300 (e.g., via lateral support bars 216). For example, in certain embodiments, the lateral support bars 216 are coupled to the arms 302 via fasteners 218, and the stationary guards 226 of the stationary guard assembly 222 are coupled to respective support bars 216 by fasteners. In addition, the blade support 220 and the movable blade assembly 224 are movably coupled to the stationary guard assembly 222 (e.g., the blade support 220 and the moving blade assembly 224 pass through openings in the stationary guards 226). The support bars 216 and the blade support 220 are flexible, thereby enabling the cutter bar assembly 202 to flex in response to variations in the soil surface (e.g., while the cutter bar assembly 202 is in contact with the soil surface). While the cutter bar assembly 202 is coupled to arms 302 via support bars 216 and fasteners 218 in the illustrated embodiment, in other embodiments, the cutter bar assembly 202 may be coupled to the arms 302 via another suitable connection system (e.g., the stationary guard assembly 222 may be welded to the arms). In addition, the blade support 220/ moving blade assembly 226 may be movably coupled to the stationary guard assembly 222 by any suitable connection system.

Figure 5:
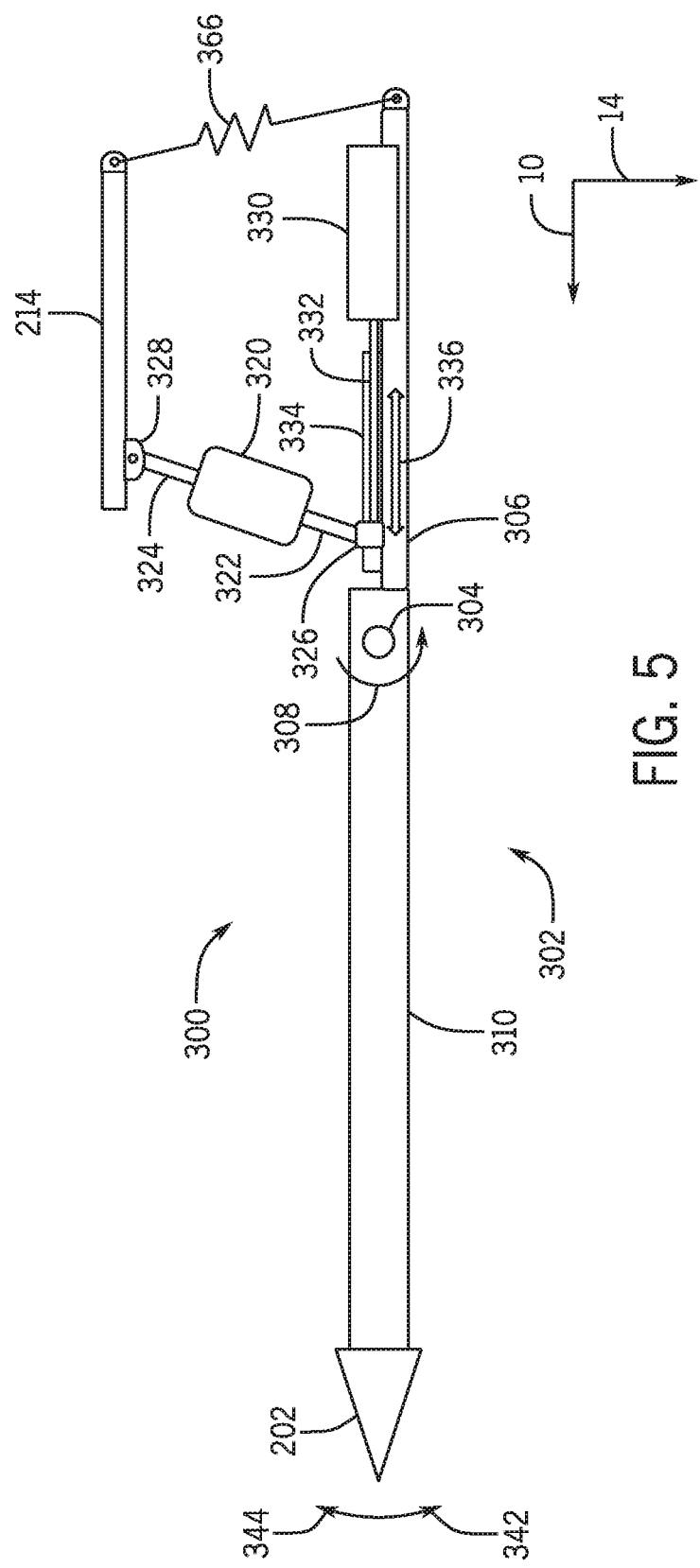
FIG. 5 is a side view of one of the arm assemblies of FIG. 3.

Turning to FIG. 5, a side view of an embodiment of one of the arm assemblies 300 that may be employed within the header 200 of FIG. 2. In this example, the arm assembly 300 includes the arm 302 that is configured to support the cutter bar assembly 202. As illustrated, the arm 302 is coupled to the cutter bar assembly 202 at a first end portion 310 of the arm 302 and is coupled to the biasing member, which includes a container 320 (e.g., airbag; flexible container), and an actuator 330 at a second end portion 306 of the arm 302. The arm assembly 300 is configured to pivot about a pivot joint 304 (e.g., pin) relative to the frame 214.

In field operation, as the harvester 100 (FIG. 1) moves over the surface of the crop field, the cutter bar assembly 202 moves generally upwardly in an upward direction 344 and generally downwardly in a downward direction 342 (e.g., to enable the cutter bar assembly 202 to cut the crops at the desired height). As the cutter bar assembly 202 moves in the upward direction 344 and in the downward direction 342, the arm assembly 302 may pivot about the pivot joint 304. The pivoting of the arm assembly 302 causes the container 320 to expand and compress.

The container 320 is configured to provide a substantially constant force to control the contact force between the cutter bar assembly 202 and the ground (e.g., floatation pressure). The container 320 may contain a volume of air to utilize the pressure of the air as a force medium. When the volume of air confined within the container 320 is compressed, it produces a reaction force. The container 320 may be inflated to the correct pressure to provide the desired elasticity for suspension, actuation, or isolation use.

In the illustrated embodiment, a first end portion 324 of the container 320 is coupled to a portion of the header frame 214 via a connection system 328. The connection system 328 may include a pivot rod (e.g., hinge) or another suitable mechanical connection device. A second end portion 322 is coupled to a carriage 326 (e.g., support, bearing, slider), which is movable along a slide 334 (e.g., track) mounted on the second end portion 306 of the arm 302. The carriage 326 is coupled to a moving rod 332 (e.g., actuator rod), which is driven by the actuator 330 to extend and retract along the slide 334 (e.g., along the longitudinal axis 10 of the arm 302). As such, the carriage 326 may move forward and backward along the slide 334 to create a substantial linear movement 336.

While the second end portion 322 of the container 320 is coupled to the arm 302 via the carriage 326 and the slide 334 in the illustrated embodiment, in other embodiments, the container 320 may be coupled to the arm 302 via another suitable connection system (e.g., a bearing block is movably coupled to a rail or guide). In addition, the container 320 may be movably coupled to the arm by any suitable connection system.

The actuator 330 is configured to receive a control signal. The control signal may be electric voltage or current, or pneumatic or hydraulic pressure. When the actuator 330 receives a control signal, the actuator 330 responds by converting the signal's energy into mechanical motion. In the illustrated embodiment, the actuator 330 may be mounted in line with the arm 302. The moving rod 332 extends from the actuator 330 and is coupled to the carriage 326. The actuator 330 may be a linear actuator, which provides linear motion for the moving rod 332 along the slide 334. The actuator 330 may be an electronic, hydraulic, or pneumatic actuator. The actuator 330 may include a position controller, a position sensor, and/or a motor. The position sensor provides the position information of certain moving parts on the actuator 330, such as the moving rod 332. The position controller may provide motion control to govern the movement (adjustment) in order to compensate decreased/increased force due to pressure change inside the air system. The motor provides drive force to make a mechanical adjustment. Alternatively, as discussed above, the drive force may be provided by hydraulic or pneumatic pressure.

In the illustrated embodiment, the arm assembly 300 includes an additional biasing member 366 (e.g., spring) coupled to the frame 214 of the header 200 and to the arm 302. The additional biasing member 366 is configured to enable the arm 302 to rotate and/or move along the vertical axis 14 relative to the frame 214 of the header 200. While the additional biasing member 366 may be a mechanical spring in the illustrated embodiment (e.g., a coil spring), in other embodiments, the arm 320 may be coupled to the frame 214 via another suitable spring (e.g., a hydraulic or pneumatic spring). In addition, the arm 302 may be coupled to the frame 214 of the header 200 via any suitable coupling system having an elastic component able to deflect under load in a prescribed manner and to recover its initial shape when unloaded. Such a coupling system is configured to provide a counter-force when the arm assembly 300 pivots about the pivot joint 304 under the influence of a force generated by compression or expansion of the container 320.

The mechanism described herein enables an adjustable connection point between the container 320 and the arm 302. As the arm assembly 300 pivots about the pivot joint 304, the container 320 compresses and expands, thus creating substantial force to the arm assembly 300 to control the contact force between the cutter bar assembly 202 and the ground. In order to maintain such substantial force, particularly when the air pressure inside the air system changes due to air leakage or temperature change, the connection point (e.g., the point where the carriage 326 is movably connected to the slide 334) between the container 320 and the arm assembly 300 is adjusted accordingly. For instance, a decreased force, which may be caused by reduced pressure due to air leakage, can be shifted to act at a distance further from the pivot joint 304, thereby maintaining a constant upward moment 308. Alternatively, an increased force, which may be caused by increased pressure due to rising temperature, can be shifted to act at a distance closer to the pivot joint 304, thereby maintaining a constant downward moment 308.

Figure 6:
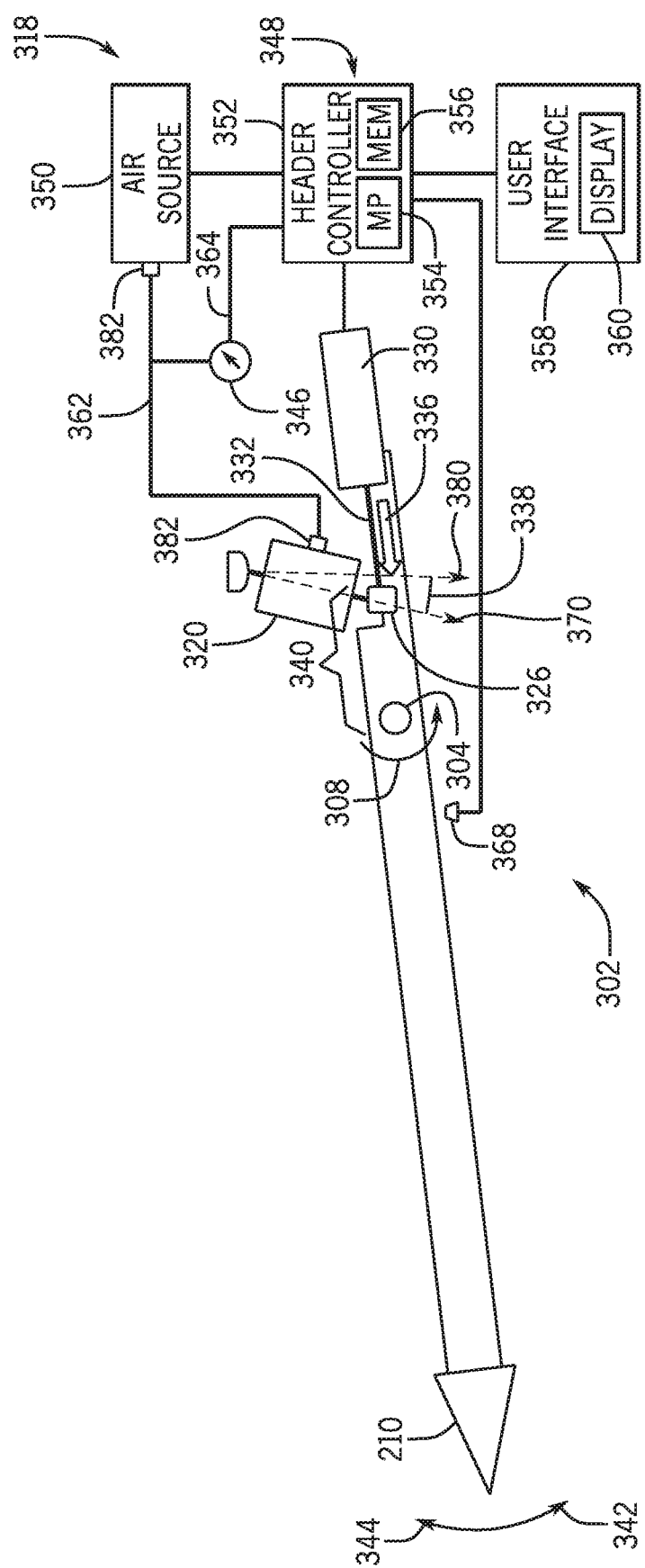
FIG. 6 is a schematic diagram of one of the arm assemblies of FIG. 3 and a control system, wherein an arm is in an on-ground float position.

FIG. 6 is a schematic diagram of an embodiment of the arm assembly 300 integrated with an air system 318 and a control system 348, in which the arm 302 is in an on-ground float position. In the on-ground float position, the cutter bar assembly 202 may conform to the ground with minimal ground pressure for an even cut. In this example, an air pressure sensor 346 is used to monitor the air pressure in the air system 318 on the header 200. The air system 318 may include the container 320 and an air source 350. The air source 350 may be configured to supply air to the container 320, thereby increasing the air pressure within the container 320, or to receive air directed out of the container 320, thereby reducing the air pressure within the container 320. Accordingly, the air source 350 may be controlled so as to set the air pressure within the container 320 for achieving a desirable stiffness of the biasing member and/or for achieving a desirable base position of the arm 302 (e.g., by controlling an actuator that controls a valve that adjusts a flow of the air between the air source 350 and one of the container 320 and/or maintains an amount of air within the container 320). It should be appreciated that the air source 350 may be coupled to multiple containers 320 associated with multiple arms 302. In some embodiments, the header 200 may include multiple air systems 318 each having a respective air source 350 and one or more biasing members (e.g., containers 320).

The control system 348 may include a header controller 352 that operates to monitor the air pressure of the air system 318 via the pressure sensor 346 and make mechanical adjustments via the actuator 330 to maintain a substantially constant upward force on the cutter bar assembly 202 through a range of air pressures within the air system 318. In addition, a flex arm position sensor 368 may be used to measure the distance between the arm(s) 302 and the ground. The flex arm position sensor 368 is a device that enables position measurement. The flex arm position sensor 368 may be an absolute position sensor or a relative one (displacement sensor).

As illustrated, the air system 318 on the header 200 may include the container 320, the air source 350, the air pressure sensor 346, air lines 362 and 364, and certain connectors/valves. The air source 350 is configured to supply air to the container 320 to substantially maintain an air pressure within the container 320. For example, as the container 320 compresses and expands over time, the volume of air within the container 320 may vary. As noted above, to enable the container 320 to apply the substantially constant force to the arm assemblies 300, the air source 350 may supply the container 320 with air and receive air from the airbag 320 to substantially maintain the air pressure within the airbag 320. The airbag 320 may be connected to the air source 350 via the first air line 362 and push-to-connect connectors 382. For example, the first air line 362 may be connected to the air source 350 at a first end and to the container 320 at a second end via push-to-connect connectors 382. The push-to-connect connectors 382 may enable the operator of the header 200 to easily connect and disconnect the first air line 362 from the container 320. In addition, the air pressure sensor 346 may be connected to the first air line 362 and to the header controller 352 electrically or via a second air line 364. The air lines may extend along the frame 214 from the air source 350 to the container 320. In certain embodiments, the air system 318 may include more or fewer components. For instance, a lock valve may be installed to keep air inside the container 320.

As previously discussed, the container 320 may provide the substantially constant force to the arm assembly 300 to control the contact force between the cutter bar assembly 202 and the ground. The air source 350 may supply air to the container 320 to substantially maintain an air pressure in the container 320. The air pressure sensor 346 may measure the pressure values, convert into electrical signals, and send them to the header controller 352. In addition, there may be more than one air pressure sensor across the header 200. Therefore, certain normalization procedure may be conducted by the header controller 352.

As will be appreciated, the header controller 352 may include a number of components or features to control operations of the air pressure sensor 346, the actuator 330, the air source 350, and the flex arm position sensor 368. For instance, as illustrated, the controller 352 may include a micro-processor (MP) 354 and a memory 356. The memory 356 may include one or more tangible, non-transitory, machine-readable media that store data to be processed by the MP 354 and/or instructions executable by the MP 354. The processed data (e.g., air pressure reading) may be sent to a user interface 358. The user interface 358 may include a display 360 suitable to enable the operator to monitor the pressure change and corresponding adjustment. The controller 352 is communicatively coupled to the actuator 330 to facilitate mechanical adjustment. On one hand, the controller 352 may receive the position information (such as location of the carriage 326 on the slide 334) from the actuator 330; on the other hand, the controller 352 may send the movement instruction to the actuator 330 after an appropriate movement is determined to compensate an air pressure reduction when needed.

In operation, in response to an increased air pressure being detected by the air sensor 346, a signal containing a pressure reading may be sent to the header controller 352. The onboard MP 354 and the memory 356 may utilize the received pressure reading and the position information from the actuator 330 to determine the appropriate movement based on the pressure increase. Next, an instruction of movement is sent to the actuator 330 to drive the carriage 326 via the rod 332 to move closer to the pivot joint 304, thus yielding a shorter lever arm. By adjusting the mechanical connection point of the container 320 to the arm 302, an increased pressure and resulting increased force can be shifted to act at a distance closer to the pivot point 304, thereby maintaining a substantially constant moment on the arm 302. For example, the moment on the arm 302 may be substantially constant while a pressure within the air system is at a first pressure and the connection point is at a first position relative to the pivot joint 304, and while the pressure within the air system is at a second pressure (different than the first pressure) and the connection point is at a second position (different than the first position) relative to the pivot joint 304.

It should be noted that in present embodiment force sensing feedback may be omitted as the geometric relationship of the container 320, mechanical connection, and pivot joint 304 are known and could be calculated to determine the appropriate movement based on pressure reduction. An equation, given by $$M=Fr\cos(\theta),$$

is used to relate moment M to the force F applied by the container 320, the radius r (as depicted in FIG. 6, a distance 340 defined as the distance between the pivot joint 304 and the connection point of the carriage 326), and the angle $\theta$ (an angle 338 defined as the angle between the direction of an applied force 370 and a vertical axis 380). The multiplication of the radius r and cosine of the angle $\theta$ yields the lever arm, which is the distance between the pivot joint 304 and the application direction of the force. The force F can be further calculated from the multiplication of pressure P and the area A of the container 320. Thus, an alternative equation is derived as $$M=PAr\cos(\theta).$$

With certain assumptions, such as the minimal change of area A and minimal angular change of the container 320 with respect to the flex arm 302, the moment M is only related to the pressure P and the radius r. Therefore, a decreased/increased pressure P can be compensated by an increased/decreased radius r in order to maintain a constant moment M. As discussed previously, the increased/decreased radius r may be achieved by adjusting the connection point between container 320 and the flex arm 302.

Figure 7:
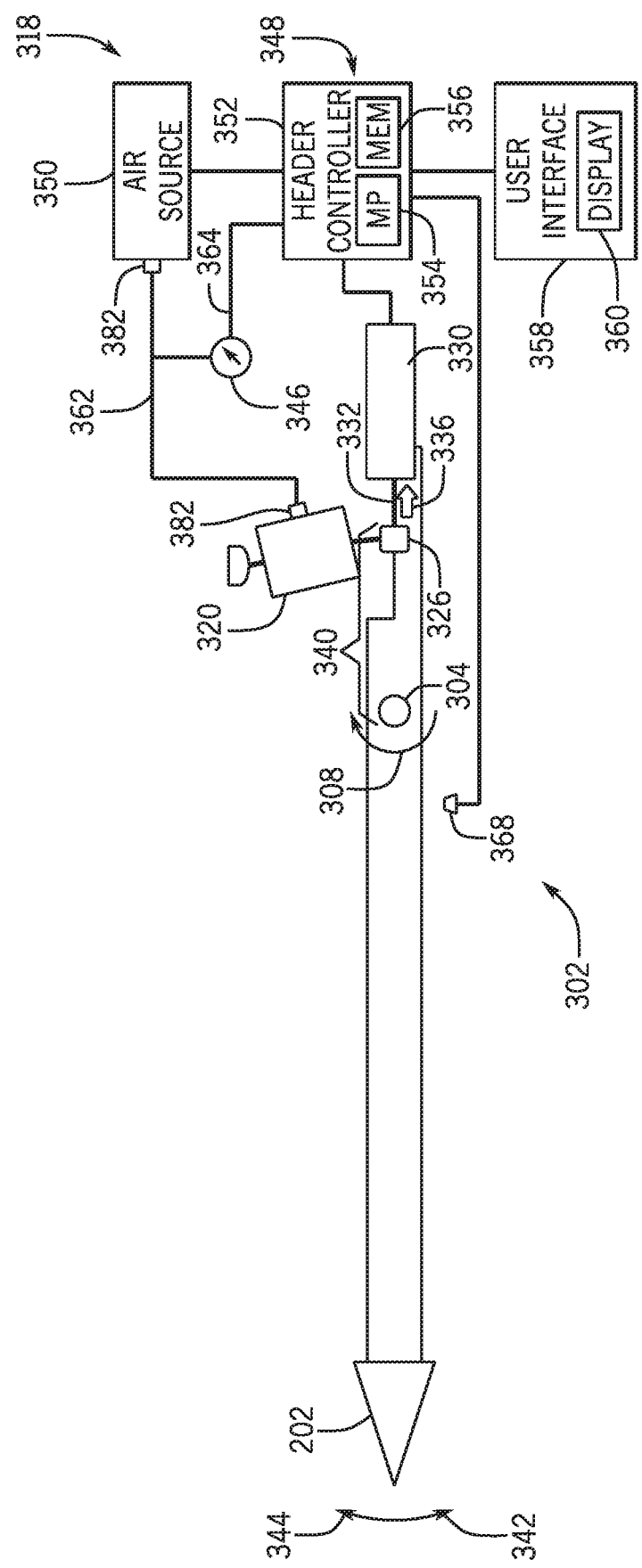
FIG. 7 is a schematic diagram of the arm assembly and the control system of FIG. 6, wherein the arm is in a flat orientation.

FIG. 7 is a schematic diagram of the arm assembly 300 of FIG. 6, in which the arm 302 of the arm assembly 300 is in a flat orientation. In operation, in response to a decreased air pressure being detected by the air sensor 346, a signal containing a pressure reading may be sent to the header controller 352. The onboard MP 354 and the memory 356 may utilize the received pressure reading and the position information from the actuator 330 to determine the appropriate movement based on the pressure reduction. Next, an instruction of movement is sent to the actuator 330 to drive the carriage 326 via the rod 332 to move further away from the pivot joint 304, thus yielding a longer lever arm. By adjusting the mechanical connection point of the container 320 to the flex arms 302, a reduced force (due to reduced pressure in the container 320) can be shifted to act at a distance further from the pivot point 304, thereby maintaining a substantially constant moment on the arm 302.

As discussed previously, the flex arm position sensor(s) 368 may be used to measure the distance between the arms 302 and the ground. The header controller 353 may be communicatively connected to the flex arm position sensor(s) 368. The operator may monitor the positions of the arms 302 during harvesting via the display 360 on the user interface 358. Based on the measured arm positions, certain adjustments may be conducted by the operator via the header controller.

Certain embodiments may be devoid of a source of pressurized air (e.g., devoid of an air compressor). However, in some embodiments, the air pressure in the air system may be adjusted depending on conditions of the field, the type of crop, and other factors by adjusting setting(s) of a valve assembly and/or a small air compressor (i.e., adjusting the setting locally or remotely from a cab of the harvester). The air compressor may be capable of compensating for small leaks. It may be automatically powered on when a reduction of air pressure is detected. In some cases, adjustments via the source of pressurized air may be used in combination with (e.g., simultaneously, sequentially) adjustments via the actuator 330, such as to achieve or to maintain a substantially constant moment on the arm 302, for example.

As illustrated in this disclosure, rather than adjusting the air pressure in the air system (which may be a slow process) in response to a pressure change (e.g., transient and substantial pressure change), the disclosure system may adjust the mechanical connection point of the containers to the arms to provide a fast process to compensate for air pressure variation (e.g., due to leakage or temperature change), so as to maintain a substantially constant moment on the arms, for example. The smooth, non-stop operation of the cutter bar assembly, even with variations in pressure occurring in the air system supporting the arms, may enable the harvester to cover more areas in a limited time, therefore increasing crop yields and reducing fuel consumptions during harvesting season. It should be appreciated that the components and techniques disclosed herein may be used with any type of fluid system, such as a hydraulic system that utilizes pressurized liquid (e.g., oil), instead of a pneumatic or air system that utilized pressurized air.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
an arm configured to rotate about a pivot joint and to support a portion of a cutter bar assembly;
a fluid-filled biasing member slidingly coupled to the arm;
an actuator coupled to the fluid-filled biasing member;
a fluid pressure sensor configured to measure a fluid pressure in the fluid-filled biasing member; and
a controller communicatively coupled to the actuator and configured to:
receive an input signal from the fluid pressure sensor indicative of the fluid pressure; and
output an output signal to instruct the actuator to adjust a connection point between the fluid-filled biasing member and the arm based on the input signal.

2. The agricultural system of claim 1, wherein the fluid-filled biasing member comprises a first end coupled to a frame of a header via a fixed connecting device.

3. The agricultural system of claim 2, wherein the fixed connecting device comprises a pivot rod.

4. The agricultural system of claim 1, wherein the fluid-filled biasing member has a second end that is slidingly coupled to the arm via a carriage.

5. The agricultural system of claim 4, wherein the actuator is configured to drive the carriage along a slide to adjust the connection point.

6. The agricultural system of claim 1, wherein the portion of the cutter bar assembly is supported by a first end portion of the arm and the fluid-filled biasing member is slidingly coupled to a second end portion of the arm.

7. The agricultural system of claim 1, wherein the actuator is an electronic actuator, a hydraulic actuator, or a pneumatic actuator.

8. The agricultural system of claim 1, wherein the controller is configured to determine an appropriate adjustment for the connection point based on the input signal and an additional input signal from a position sensor indicative of a current position of the connection point.

9. The agricultural system of claim 1, wherein the controller is configured to output the output signal to instruct the actuator to adjust the connection point to a position relative to the pivot joint in response to changes in the fluid pressure to maintain a substantially constant moment on the arm.

10. A harvester header, comprising:
a frame;
a cutter bar assembly configured to cut the crops;
an arm coupled to the frame and to the cutter bar assembly;
an air system coupled to the frame and to the arm, comprising
a fluid-filled biasing member configured to provide an upward force on the cutter bar assembly via the arm;
an air pressure sensor configured to measure an air pressure in the air system; and
a carriage configured to provide an adjustable mechanical connection point between the fluid-filled biasing member and the arm.

11. The harvester header of claim 10, comprising an actuator coupled to the carriage and configured to urge the carriage to adjust the adjustable mechanical connection point.

12. The harvester header of claim 11, comprising a controller communicatively coupled to the actuator, wherein the controller is configured to receive an input signal from the air pressure sensor indicative of the air pressure in the air system and to provide an output signal to the actuator to cause the actuator to urge the carriage to adjust the adjustable mechanical connection point to maintain the upward force on the cutter bar assembly through a range of decreasing air pressures within the air system.

13. The harvester header of claim 11, comprising a controller communicatively coupled to the actuator, wherein the controller is configured to instruct the actuator to urge the carriage so that a first moment on the arm while the air pressure is at a first pressure and the carriage is at a first location is substantially equal to a second moment on the arm while the air pressure is at a second pressure and the carriage is at a second location.

14. The harvester header of claim 11, comprising a controller communicatively coupled to the actuator, wherein the controller is configured to instruct the actuator to urge the carriage in response to a change in the air pressure in the air system.

15. The harvester header of claim 10, comprising an air compressor configured to increase the air pressure in the air system.

16. The harvester header of claim 15, wherein the air compressor is configured to be automatically powered on to increase the air pressure in response to a detection of a reduction in the air pressure in the air system.

17. The harvester header of claim 10, wherein the arm is pivotally coupled to the frame and is configured to pivot about an axis that extends laterally across the harvester header.

18. A method of operating a harvester header, comprising:
receiving, at a controller, an input signal indicative of an air pressure within an air system of the harvester header; and
outputting, via the controller, an output signal to an actuator to cause the actuator to drive a carriage coupled to a fluid-filled biasing member along an arm that supports a cutter bar assembly of the harvester header in response to the input signal being indicative of a change in the air pressure within the air system.

19. The method of claim 18, comprising continuously receiving additional input signals indicative of the air pressure within the air system over time at the controller and continuously outputting additional output signals to the actuator via the controller to maintain an upward force on the cutter bar assembly via the arm through a range of decreasing air pressures within the air system.

20. The method of claim 18, comprising outputting the output signal via the controller such that a first moment on the arm while the air pressure is at a first pressure and the carriage is at a first location along the arm is substantially equal to a second moment on the arm while the air pressure is at a second pressure and the carriage is at a second location along the arm.

* * * * *